(12) United States Patent
Nishiyama

(10) Patent No.: US 9,385,586 B2
(45) Date of Patent: Jul. 5, 2016

(54) SNUBBER CIRCUIT

(71) Applicant: Murata Manufacturing Co., Ltd., Nagaokakyo-shi, Kyoto-fu (JP)

(72) Inventor: Takayoshi Nishiyama, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 234 days.

(21) Appl. No.: 14/159,615

(22) Filed: Jan. 21, 2014

(65) Prior Publication Data

US 2014/0133188 A1    May 15, 2014

Related U.S. Application Data

(63) Continuation of application No. PCT/JP2012/068802, filed on Jul. 25, 2012.

(30) Foreign Application Priority Data

Aug. 5, 2011   (JP) ................................ 2011-171774

(51) Int. Cl.
   *H02M 3/335*   (2006.01)
   *H02M 1/34*    (2007.01)

(52) U.S. Cl.
   CPC ............ *H02M 1/34* (2013.01); *H02M 3/33507* (2013.01); *H02M 2001/344* (2013.01)

(58) Field of Classification Search
   CPC ......... H02M 1/32; H02M 1/34; H02M 3/335; H02M 3/33507; H02M 2001/344
   See application file for complete search history.

(56) References Cited

U.S. PATENT DOCUMENTS

| 4,334,254 | A | * | 6/1982 | Baker | ..................... | H02M 1/34 361/9 |
| 5,278,748 | A | * | 1/1994 | Kitajima | ................. | H02M 1/34 363/21.02 |
| 5,508,903 | A | * | 4/1996 | Alexndrov | ........ | H02M 3/33569 363/16 |
| 6,917,529 | B2 | * | 7/2005 | Caron | ..................... | H02M 1/34 363/56.12 |
| 7,161,331 | B2 | * | 1/2007 | Wai | ......................... | H02M 1/34 323/222 |

FOREIGN PATENT DOCUMENTS

| JP | 01-202161 A | 8/1989 |
| JP | 03-159565 A | 7/1991 |
| JP | 05-083934 A | 4/1993 |
| JP | 2003-018839 A | 1/2003 |

OTHER PUBLICATIONS

Official Communication issued in International Patent Application No. PCT/JP2012/068802, mailed on Oct. 16, 2012.

* cited by examiner

*Primary Examiner* — Matthew Nguyen
(74) *Attorney, Agent, or Firm* — Keating & Bennett, LLP

(57) ABSTRACT

A snubber circuit of a switching power supply device includes a transistor and a capacitor which are connected in series between a cathode and an anode of a diode, and a secondary winding of a transformer. A vibration voltage is generated in the secondary winding when a surge voltage is generated in the diode. The snubber circuit further includes a differentiating circuit which differentiates a voltage between terminals of the secondary winding, and a peak charging circuit which generates a control voltage of a waveform connecting a plurality of peaks of an output voltage of the differentiating circuit and applies the control voltage to a gate of the transistor to cause the transistor conduct.

16 Claims, 5 Drawing Sheets

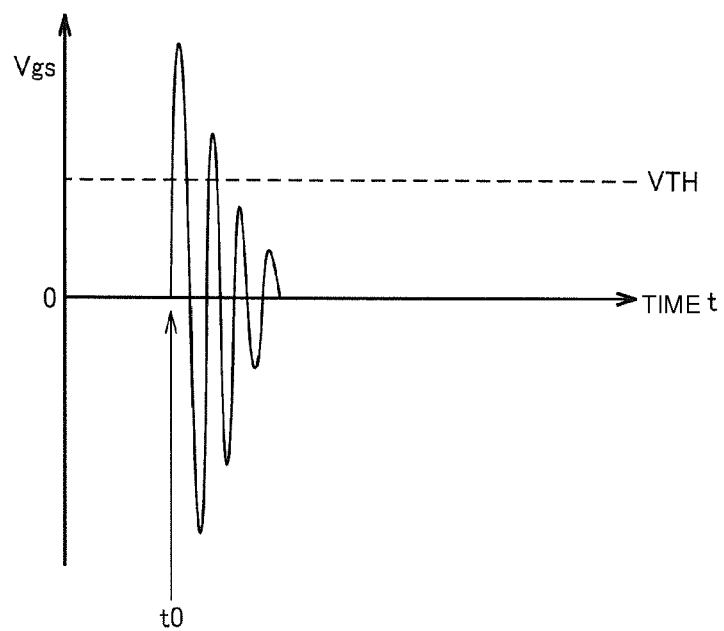

SNUBBER CIRCUIT

BACKGROUND OF THE INVENTION

1. Field of the Invention

The present invention relates to a snubber circuit and particularly relates to a snubber circuit which suppresses a surge voltage generated in a rectifier circuit of a switching power supply device.

2. Description of the Related Art

In general, a switching power supply device includes a transformer which includes a primary winding and a secondary winding; a first switching element which intermittently applies a DC power supply voltage to the primary winding; a rectifier circuit which is connected to the secondary winding; and a smoothing circuit which includes a first coil connected subsequently to the rectifier circuit. In such a switching power supply device, since a surge voltage is generated in the rectifier circuit when the voltage of the secondary winding rises, a snubber circuit which suppresses a surge voltage is connected to the rectifier circuit.

As the snubber circuit, there is a circuit which includes a second switching element and a capacitor which are connected in series between output nodes of the rectifier circuit; a second coil which is electromagnetically coupled to the first coil; and a differentiating circuit which differentiates an output voltage of the second coil and applies the differentiated voltage to a control terminal of the second switching element. In the snubber circuit, the second switching element is switched ON at the timing when a surge voltage is generated in the rectifier circuit, and the energy of the surge voltage is stored in the capacitor and then released (see, for example, Japanese Unexamined Patent Application Publication No. 1-202161).

However, in an existing snubber circuit, depending on the configurations of first and second coils, as shown in FIG. 5, when a voltage between terminals of the second coil is raised to a positive voltage (time t0), a vibration voltage is generated between the terminals of the second coil, and a control voltage Vgs having the same waveform as that of the vibration voltage is applied to the control terminal of a second switching element. The control voltage Vgs attenuates over time while vibrating.

When a threshold voltage for the second switching element is denoted by VTH, the second switching element is switched ON during a period of Vgs>VTH, and the second switching element is switched OFF during a period of Vgs<VTH. Therefore, the second switching element repeatedly switches ON/OFF, it is impossible to switch the second switching element ON at a predetermined timing, and it is impossible to sufficiently suppress a surge voltage.

SUMMARY OF THE INVENTION

Therefore, preferred embodiments of the present invention provide a snubber circuit which is able to sufficiently suppress a surge voltage.

A snubber circuit according to a preferred embodiment of the present invention is a snubber circuit that suppresses a surge voltage generated in a rectifier circuit in a switching power supply device and includes a transformer which includes a primary winding and a secondary winding; a first switching element which intermittently applies a DC power supply voltage to the primary winding; the rectifier circuit which is connected to the secondary winding; and, the snubber circuit includes a second switching element and a first capacitor which are connected in series between output nodes of the rectifier circuit; and a second coil which is electromagnetically coupled to the first coil. A vibration voltage is generated between terminals of the second coil at a timing when the surge voltage is generated in the rectifier circuit. The snubber circuit further includes a differentiating circuit which differentiates a voltage between the terminals of the second coil; and a voltage generation circuit which generates a control voltage obtained by smoothing an output voltage of the differentiating circuit and applies the control voltage to a control terminal of the second switching element to cause the second switching element to conduct.

Preferably, the voltage generation circuit includes a first diode which is arranged in a forward direction in a current path between the second coil and the control terminal of the second switching element in the differentiating circuit; and a second capacitor which is connected between the control terminal of the second switching element and a positive-side output node of the rectifier circuit.

In addition, preferably, a second diode which is connected in the forward direction between the positive-side output node of the rectifier circuit and an anode of the first diode is further included.

In the snubber circuit according to various preferred embodiments of the present invention, the voltage generation circuit which generates a control voltage obtained by smoothing an output voltage of the differentiating circuit and applies the control voltage to a control terminal of the second switching element to cause the second switching element to conduct, is provided. Therefore, even when a vibration voltage is generated between the terminals of the second coil, it is possible to switch the second switching element ON at a predetermined timing, and it is possible to sufficiently suppress a surge voltage.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 5 is a time chart for explaining a problem of an existing switching power supply device.

DETAILED DESCRIPTION OF THE PREFERRED EMBODIMENTS

Figure 1:
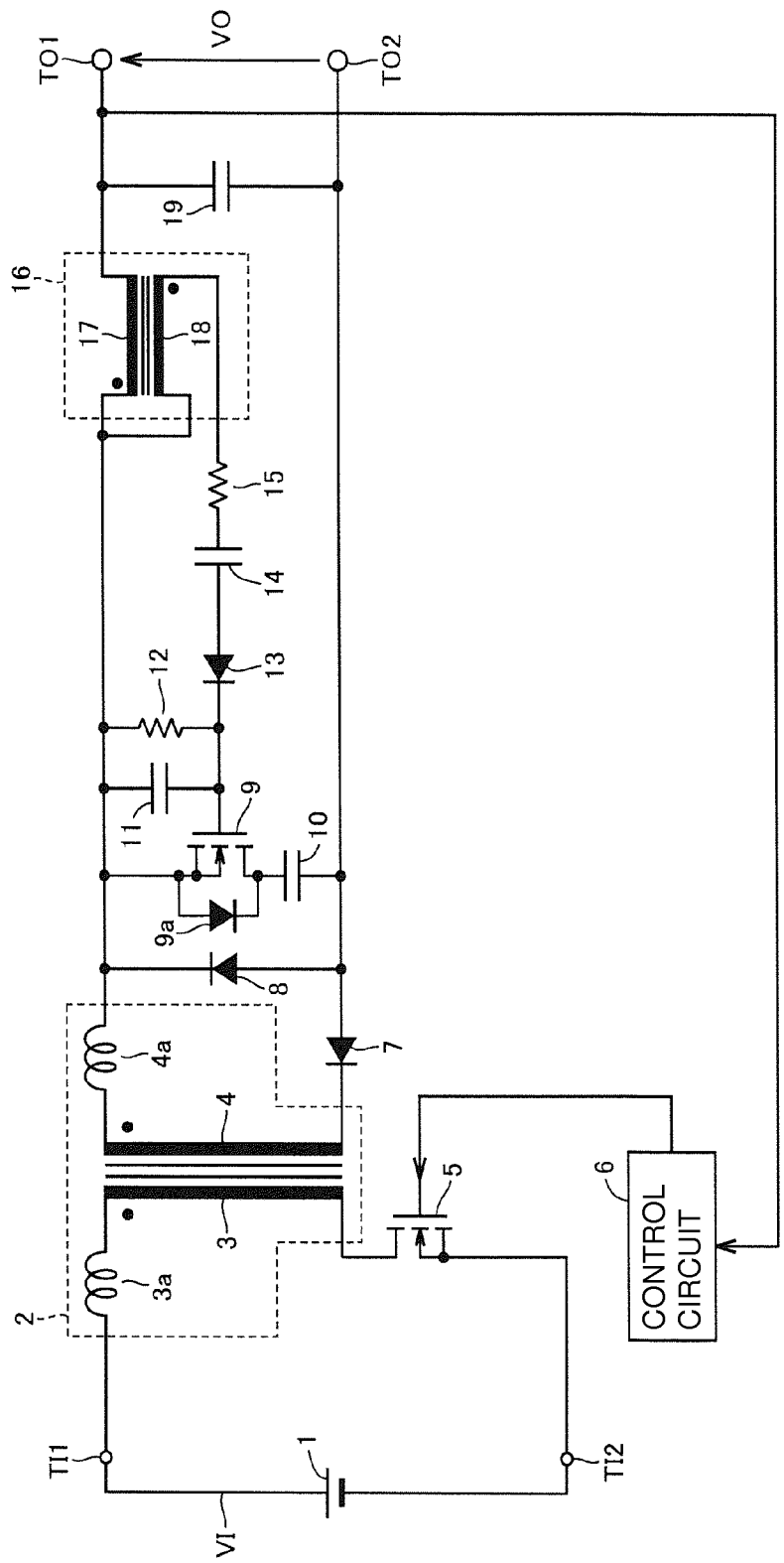
FIG. 1 is a circuit block diagram showing a configuration of a switching power supply device according to a preferred embodiment of the present invention.

As shown in FIG. 1, a switching power supply device according to a preferred embodiment of the present invention includes a positive-side input terminal TI1, a negative-side input terminal TI2, a positive-side output terminal TO1, a negative-side output terminal TO2, transformers 2 and 16, N-channel MOS transistors 5 and 9 which are switching elements, a control circuit 6, diodes 7, 8, 9a, and 13, capacitors 10, 11, 14, and 19, and resistive elements 12 and 15.

The positive-side input terminal TI1 and the negative-side input terminal TI2 are connected to a positive electrode and a negative electrode, respectively, of a DC power supply 1 and receive a DC power supply voltage VI from the DC power supply 1. The transformer 2 includes a primary winding 3 and a secondary winding 4. The windings 3 and 4 include leak inductances 3a and 4a, respectively.

A first terminal (a terminal indicated by a black circle mark) of the primary winding 3 is connected to the positive-side input terminal TI1. The drain of the N-channel MOS transistor 5 (switching element) is connected to a second terminal of the primary winding 3, the source of the N-channel MOS transistor 5 is connected to the negative-side input terminal TI2, and the gate of the N-channel MOS transistor 5 receives an output voltage of the control circuit 6.

The control circuit 6 switches the N-channel MOS transistor 5 ON/OFF at predetermined periods such that a voltage VO of the positive-side output terminal TO1 becomes a predetermined target voltage. When the output voltage VO is lower than the target voltage, the control circuit 6 lengthens the ON time per one period for the transistor 5. When the output voltage VO is higher than the target voltage, the control circuit 6 decreases the ON time per one period for the transistor 5.

The cathode of the diode 7 which is a rectification-side diode is connected to a second terminal of the secondary winding 4 of the transformer 2, and the anode of the diode 7 is connected to a negative-side output terminal TO2. The cathode of the diode 8 which is a commutation-side diode is connected to a first terminal (terminal indicated by a black circle mark) of the secondary winding 4 of the transformer 2, and the anode of the diode 8 is connected to the negative-side output terminal TO2. The diodes 7 and 8 constitute a rectifier circuit.

The source of the N-channel MOS transistor 9 is connected to the cathode of the diode 8, and the drain of the N-channel MOS transistor 9 is connected to the anode of the diode 8 via the capacitor 10. The diode 9a is connected between the source and drain of the N-channel MOS transistor 9. In other words, the anode of the diode 9a is connected to the source of the N-channel MOS transistor 9, and the cathode of the diode 9a is connected to the drain of the N-channel MOS transistor 9. The diode 9a may be a parasitic diode (body diode) of the N-channel MOS transistor 9, or may be a component separate from the N-channel MOS transistor 9. The capacitor 11 and the resistive element 12 are connected in parallel between the gate and the source of the N-channel MOS transistor 9.

The transformer 16 includes a primary winding 17 (first coil) and a secondary winding 18 (second coil). A first terminal (terminal indicated by a black circle mark) of the primary winding 17 of the transformer 16 is connected to the first terminal of the secondary winding 4 of the transformer 2, and a second terminal of the primary winding 17 is connected to the positive-side output terminal TO1. The cathode of the diode 13 is connected to the gate of the N-channel MOS transistor 9, and the anode of the diode 13 is connected to a first terminal (terminal indicated by a black circle mark) of the secondary winding 18 via the capacitor 14 and the resistive element 15. A second terminal of the secondary winding 18 is connected to the first terminal of the primary winding 17. The capacitor 19 is connected between the output terminals TO1 and TO2.

The primary winding 17 of the transformer 16 and the capacitor 19 constitute a smoothing circuit. The N-channel MOS transistor 9, the capacitors 10, 11, and 14, the resistive elements 12 and 15, the diode 13, and the secondary winding 18 of the transformer 16 constitute a snubber circuit. The resistive elements 12 and 15 and the capacitor 14 constitute a differentiating circuit. The capacitor 11 and the diode 13 constitute a peak charging circuit (voltage generation circuit).

Next, an operation of the switching power supply device will be described. When the N-channel MOS transistor 5 is switched ON/OFF at predetermined periods by the control circuit 6, a DC power supply voltage VI is intermittently applied to the primary winding 3 of the transformer 2 and an AC voltage is generated between the terminals of the secondary winding 4. During a period when a positive voltage is generated at the first terminal of the secondary winding 4, a current flows in a path of the first terminal of the secondary winding 4, the primary winding 17 of the transformer 16, the capacitor 19, the diode 7, and the second terminal of the secondary winding 4, the capacitor 19 is charged, and electromagnetic energy is stored in the primary winding 17 of the transformer 16.

When a negative voltage is generated at the first terminal of the secondary winding 4, the diode 7 is switched OFF, a current flows in a path of the primary winding 17 of the transformer 16, the capacitor 19, and the diode 8, the capacitor 19 is charged. However, when power is consumed by a load (not shown) connected to the output terminals TO1 and TO2, the output voltage VO falls. The control circuit 6 controls the N-channel MOS transistor 5 to switch the N-channel MOS transistor 5 ON/OFF such that the output voltage VO becomes a target voltage.

Here, a surge voltage generated between the cathode and the anode of the diode 8 will be described. As described above, when a negative voltage is generated at the first terminal of the secondary winding 4 of the transformer 2, a current flows through the diode 8 in a forward bias direction by electromagnetic energy stored in the primary winding 17 of the transformer 16. Then, when a positive voltage is generated at the first terminal of the secondary winding 4 of the transformer 2, a current momentarily flows through the diode 8 in a reverse bias direction by reverse recovery characteristics of the diode 8. When the diode 8 is switched OFF and a reverse bias current is blocked, a surge voltage is generated between the cathode and the anode of the diode 8. The snubber circuit greatly suppresses the surge voltage.

Specifically, at the timing when a surge voltage is generated, the snubber circuit switches the N-channel MOS transistor 9 ON to cause the capacitor 10 to absorb the energy of the surge voltage. In addition, the snubber circuit causes the energy of the surge voltage, absorbed by the capacitor 10, to be released via the N-channel MOS transistor 9 after generation of the surge voltage. The ON/OFF control of the N-channel MOS transistor 9 is performed by applying a voltage between the terminals of the secondary winding 18 of the transformer 16 to between the gate and the source of the N-channel MOS transistor 9 via the differentiating circuit (the resistive elements 12 and 15 and the capacitor 14).

In addition, when the differentiating circuit is merely provided between the secondary winding 18 of the transformer 16 and the gate of the N-channel MOS transistor 9, there is a problem that a vibration voltage is generated between the terminals of the secondary winding 18 of the transformer 16 at the timing when the voltage between the terminals of the secondary winding 4 of the transformer 2 is raised to a positive. The generation of the vibration voltage is due to parasitic capacitances or parasitic inductances of the windings 17 and 18 of the transformer 16.

Figure 2:
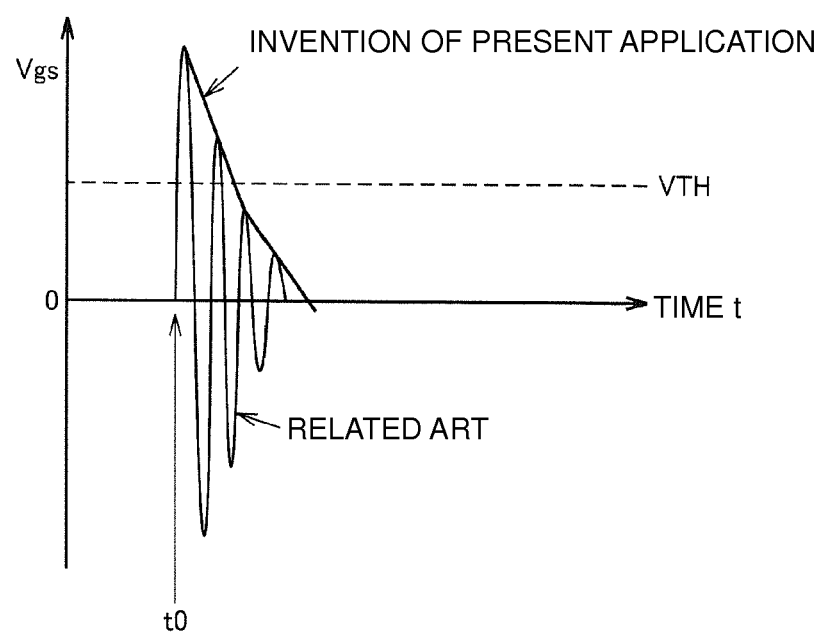
FIG. 2 is a time chart showing effects of a snubber circuit shown in FIG. 1.

FIG. 2 is a time chart showing a voltage Vgs between the gate and the source of the N-channel MOS transistor 9. In FIG. 2, when the voltage between the terminals of the secondary winding 4 of the transformer 2 is raised to a positive voltage (time t0), a vibration voltage is generated between the terminals of the secondary winding 18 of the transformer 16. The vibration voltage attenuates with time while vibrating. In an existing snubber circuit, as described with reference to FIG. 5, a voltage having the same waveform as that of the vibration voltage is applied to between the gate and the source of the N-channel MOS transistor 9. Thus, the N-channel MOS transistor 9 repeatedly switches ON/OFF, and it is impossible to switch the N-channel MOS transistor 9 ON at a predetermined timing, and it is impossible to sufficiently suppress a surge voltage generated in the diode 8.

On the other hand, in a preferred embodiment of the present invention, the peak charging circuit including the diode 13 and the capacitor 11 is added. Even when a vibration voltage is generated between the terminals of the secondary winding 18 of the transformer 16, a current flows only in the forward direction of the diode 13, and the current that has passed through the diode 13 is stored in the capacitor 11. Therefore, the waveform of Vgs becomes a waveform connecting a plurality of peaks of the vibration voltage at the positive side as shown in FIG. 2, that is, a waveform obtained by smoothing the vibration voltage which is the output voltage of the differentiating circuit. Thus, according to a preferred embodiment of the present invention, the N-channel MOS transistor 9 is switched ON at a predetermined timing, and it is possible to sufficiently suppress a surge voltage generated in the diode 8.

Figure 3:
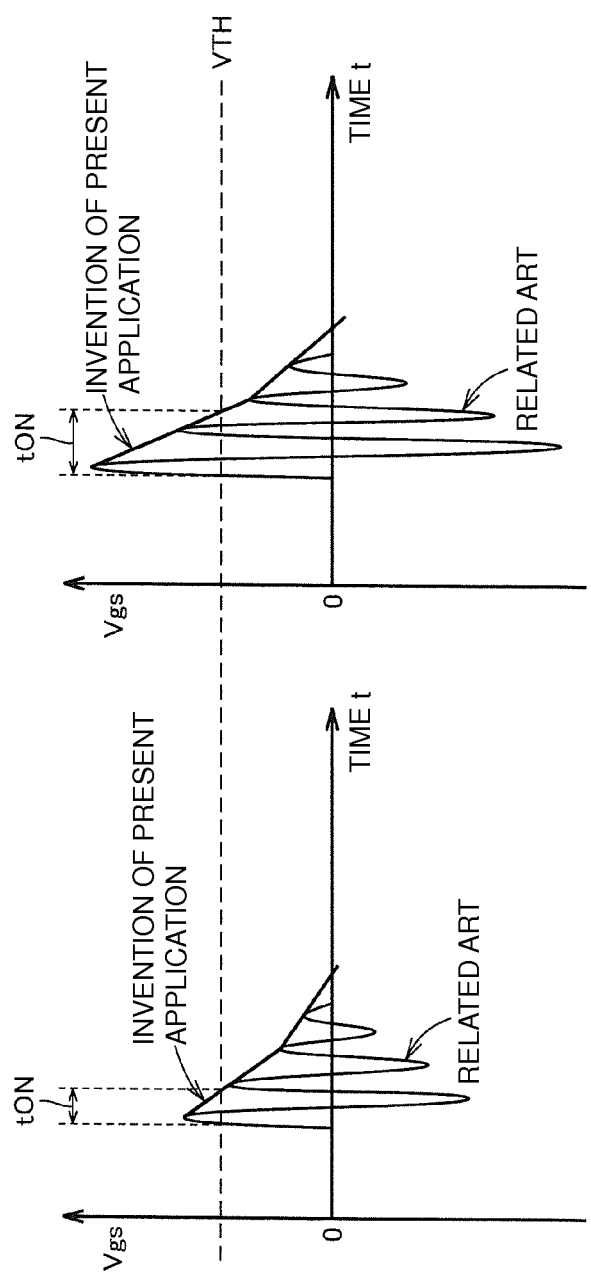
FIGS. 3A and 3B are other time charts showing the effects of the snubber circuit shown in FIG. 1.

In addition, FIG. 3A is a time chart showing a waveform of Vgs in the case where the output current of the switching power supply device is low, and FIG. 3B is a time chart showing a waveform of Vgs in the case where the output current of the switching power supply device is high. As is clear from FIGS. 3A and 3B, the higher the output current is, the greater the amplitude of the vibration voltage is. Thus, the time tON when the N-channel MOS transistor 9 is switched ON is lengthened. Therefore, even when the output current is increased and the energy of a surge voltage is increased, the ON time tON of the N-channel MOS transistor 9 is lengthened, and thus it is possible to sufficiently suppress a surge voltage.

Figure 4:
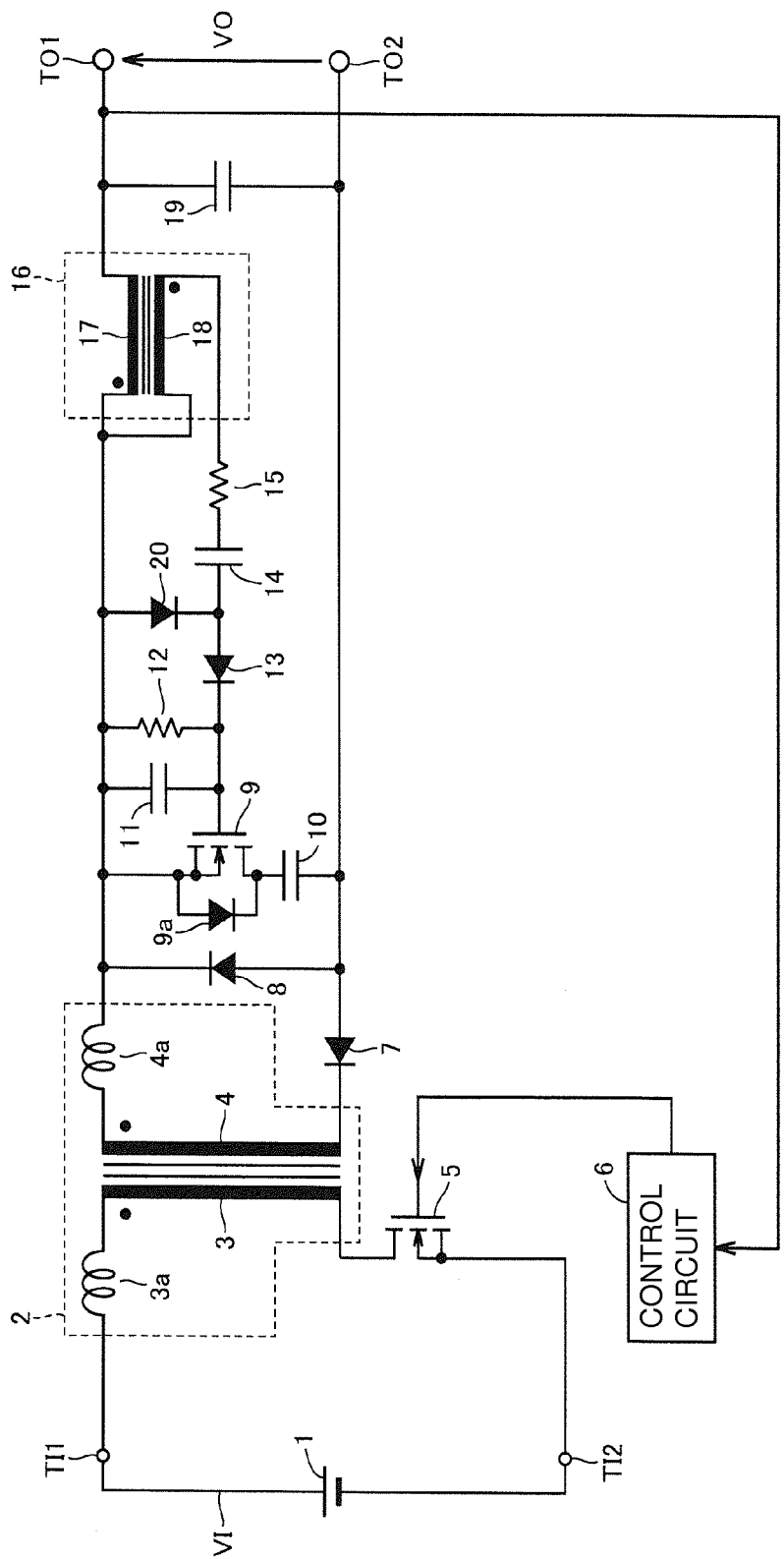
FIG. 4 is a circuit block diagram showing a modification example of a preferred embodiment of the present invention.

Moreover, FIG. 4 is a circuit block diagram showing a modification example of a preferred embodiment of the present invention and is a diagram compared to FIG. 1. With reference to FIG. 4, the switching power supply device is obtained by adding a diode 20 to the switching power supply device in FIG. 1. The anode of the diode 20 is connected to the source of the N-channel MOS transistor 9, and the cathode of the diode 20 is connected to the anode of the diode 13. The diode 20 is able to prevent a gate voltage of the N-channel MOS transistor 9 from being equal to or lower than a source voltage of the N-channel MOS transistor 9. Thus, it is possible to lengthen the ON time of the N-channel MOS transistor 9, and it is possible to adjust, in a wide range, the timing of absorption and discharge of the energy of a surge voltage to and from the capacitor 10.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A snubber circuit that suppresses a surge voltage generated in a rectifier circuit in a switching power supply device including a transformer which includes a primary winding and a secondary winding connected to the rectifier circuit, a first switching element which intermittently applies a DC power supply voltage to the primary winding, and a smoothing circuit which includes a first coil connected to a stage subsequent to the rectifier circuit, the snubber circuit comprising:
   a second switching element and a first capacitor which are connected in series between output nodes of the rectifier circuit; and
   a second coil which is electromagnetically coupled to the first coil such that a vibration voltage is generated between terminals of the second coil when the surge voltage is generated in the rectifier circuit;
   a differentiating circuit which differentiates a voltage between the terminals of the second coil; and
   a voltage generation circuit which generates a control voltage obtained by smoothing an output voltage of the differentiating circuit and applies the control voltage to a control terminal of the second switching element to cause the second switching element to conduct; wherein
   the voltage generation circuit includes a rectifying element which rectifies an output current from the second coil in a direction of the control terminal of the second switching element.

2. The snubber circuit according to claim 1, wherein
   the rectifying element is a first diode which is arranged in a forward direction in a current path between the second coil and the control terminal of the second switching element in the differentiating circuit; and
   the voltage generation circuit further includes a second capacitor which is connected between the control terminal of the second switching element and a positive-side output node of the rectifier circuit.

3. The snubber circuit according to claim 2, further comprising a second diode which is connected in the forward direction between the positive-side output node of the rectifier circuit and an anode of the first diode.

4. The snubber circuit according to claim 1, wherein the first coil and a capacitor define the smoothing circuit.

5. The snubber circuit according to claim 1, wherein the second switching element is an N-channel MOS transistor.

6. The snubber circuit according to claim 1, further comprising a plurality of capacitors.

7. The snubber circuit according to claim 6, further comprising a plurality of resistive elements.

8. The snubber circuit according to claim 7, wherein the capacitors and the resistive elements define the differentiating circuit.

9. A switching power supply device comprising:
   a rectifier circuit;
   a snubber circuit that suppresses a surge voltage generated in the rectifier circuit;
   a transformer including a primary winding and a secondary winding connected to the rectifier circuit;
   a first switching element which intermittently applies a DC power supply voltage to the primary winding; and
   a smoothing circuit which includes a first coil connected to a stage subsequent to the rectifier circuit; wherein
   the snubber circuit includes:
      a second switching element and a first capacitor which are connected in series between output nodes of the rectifier circuit; and
      a second coil which is electromagnetically coupled to the first coil such that a vibration voltage is generated between terminals of the second coil when the surge voltage is generated in the rectifier circuit;
      a differentiating circuit which differentiates a voltage between the terminals of the second coil; and
      a voltage generation circuit which generates a control voltage obtained by smoothing an output voltage of the differentiating circuit and applies the control voltage to a control terminal of the second switching element to cause the second switching element to conduct; and the voltage generation circuit includes a rectifying element which rectifies an output current from the second coil in a direction of the control terminal of the second switching element.

10. The switching power supply device according to claim 9, wherein the rectifying element is a first diode which is arranged in a forward direction in a current path between the second coil and the control terminal of the second switching element in the differentiating circuit; and the voltage generation circuit includes a second capacitor which is connected between the control terminal of the second switching element and a positive-side output node of the rectifier circuit.

11. The switching power supply device according to claim 10, further comprising a second diode which is connected in the forward direction between the positive-side output node of the rectifier circuit and an anode of the first diode.

12. The switching power supply device according to claim 9, wherein the first coil and a capacitor define the smoothing circuit.

13. The switching power supply device according to claim 9, wherein the second switching element is an N-channel MOS transistor.

14. The switching power supply device according to claim 9, wherein the snubber circuit further comprises a plurality of capacitors.

15. The switching power supply device according to claim 14, wherein the snubber circuit further comprises a plurality of resistive elements.

16. The switching power supply device according to claim 15, wherein the capacitors and the resistive elements define the differentiating circuit.

* * * * *